(12) United States Patent
Magoshi (10) Patent No.: US 7,162,620 B2
(45) Date of Patent: Jan. 9, 2007

(54) METHODS AND APPARATUS FOR MULTI-PROCESSING EXECUTION OF COMPUTER INSTRUCTIONS

(75) Inventor: Hidetaka Magoshi, Palo Alto, CA (US)

(73) Assignee: Sony Computer Entertainment Inc. (JP)

( * ) Notice: Subject to any disclaimer, the term of this patent is extended or adjusted under 35 U.S.C. 154(b) by 725 days.

(21) Appl. No.: 10/202,355

(22) Filed: Jul. 24, 2002

(65) Prior Publication Data

US 2003/0177343 A1 Sep. 18, 2003

Related U.S. Application Data

(60) Provisional application No. 60/363,873, filed on Mar. 13, 2002.

(51) Int. Cl.
*G06F 15/80* (2006.01)

(52) U.S. Cl. ........................... 712/241; 712/24

(58) Field of Classification Search ............... 712/241, 712/233, 219, 235, 24
See application file for complete search history.

(56) References Cited

U.S. PATENT DOCUMENTS

| | | | | |
|---|---|---|---|---|
| 5,517,648 | A | * | 5/1996 | Bertone et al. ............. 710/244 |
| 5,522,083 | A | | 5/1996 | Gove et al. |
| 5,764,934 | A | | 6/1998 | Fisch et al. |
| 5,809,340 | A | * | 9/1998 | Bertone et al. ............. 710/58 |
| 6,088,783 | A | | 7/2000 | Morton |
| 6,212,617 | B1 | | 4/2001 | Hardwick |
| 6,219,773 | B1 | | 4/2001 | Garibay, Jr. et al. |
| 6,269,440 | B1 | | 7/2001 | Fernando et al. |
| 6,321,322 | B1 | | 11/2001 | Pechanek et al. |
| 6,349,377 | B1 | | 2/2002 | Lindwer |
| 6,442,635 | B1 | | 8/2002 | Brightman et al. |
| 2006/0020771 | A1 | | 1/2006 | Kunimatsu et al. |

FOREIGN PATENT DOCUMENTS

| | | |
|---|---|---|
| KR | 1998-10805 | 4/1998 |
| KR | 2001-51125 | 6/2001 |

OTHER PUBLICATIONS

"Performance Evaluation Of Cascade ALU Architecture For Asynchronous Super-Scalar Processors", Motokazu Ozawa, Masashi Imai, Yoichiro Ueno, Hiroshi Nakamura, Takashi Nanya, Published in the Proc. of ASYNC-2001, pp. 162-172, Mar. 2001.

* cited by examiner

Primary Examiner—Henry W. H. Tsai
(74) Attorney, Agent, or Firm—Lerner,David,Littenberg,Krumholz & Mentlik, LLP (57) ABSTRACT

A multi-processing computer architecture and a method of operating the same are provided. The multi-processing architecture provides a main processor and multiple sub-processors cascaded together to efficiently execute loop operations. The main processor executes operations outside of a loop and controls the loop. The multiple sub-processors are operably interconnected, and are each assigned by the main processor to a given loop iteration. Each sub-processor is operable to receive one or more sub-instructions sequentially, operate on each sub-instruction and propagate the sub-instruction to a subsequent sub-processor.

52 Claims, 5 Drawing Sheets

METHODS AND APPARATUS FOR MULTI-PROCESSING EXECUTION OF COMPUTER INSTRUCTIONS

CROSS-REFERENCE TO RELATED APPLICATIONS

This application claims the benefits of U.S. Provisional Patent Application No. 60/363,873, filed Mar. 13, 2002, entitled GRAPHICS SHADING PROCESSOR, the entire disclosure of which is hereby incorporated by reference.

BACKGROUND OF THE INVENTION

The present invention relates to execution of computer instructions, and, more particularly, the present invention relates to the efficient execution of loop operations using multiple sub-processors.

Computer systems are used to perform a variety of tasks in a wide range of applications. Often, a microprocessor controls operation of the computer system. The microprocessor may be programmed to handle specific operations in a particular manner. Typically, the microprocessor fetches or otherwise receives an instruction. The instruction tells the microprocessor to perform an operation, such as adding data, jumping to a different part of a program, or performing a logic operation. Performing the operation may include one or more steps of decoding the instruction, calculating an address in memory, accessing/reading data from memory, executing the instruction employing the data and writing a result into memory.

Certain applications, such as computer graphics, are computationally intensive, and may require performing many instructions to effectively render and display an image on a display device. One particular computationally intensive computer graphics application is three-dimensional graphics processing for polygon/pixel shading (e.g., graphics shading). For example, a video game display may show a ball thrown from one player to another player. The ball and other objects on the display may be represented as a series of polygons. As the ball travels across the display, the shading of the ball and objects covered by its shadow can change. The microprocessor may compute and/or re-compute shading for each picture element ("PEL") of each polygon that the ball and shadow intersect. Such computations may include multiple iterations (i.e., loops) and millions of calculations.

A drawback for a single microprocessor handing all of the instructions and calculations for a particular operation, such as in the graphics shading example above, is time. Typically, the more instructions that are performed, the longer the overall computation takes. One method to handle such computationally intensive applications is for the microprocessor to break up a task and distribute portions of the task among one or more sub-processors. The task may be one or more instructions, or it may be one or more segments of a single instruction. Spreading the task among sub-processors reduces the time to complete the task. Other benefits include higher data throughput and improved system reliability. Also, because the sub-processors repeatedly perform identical or similar operations, the sub-processors may be tailored to efficiently perform those operations (e.g., perform a subset of instructions).

In one method of distributing tasks, the main processor sends an instruction to a group of sub-processors in parallel. In another method of distributing tasks among sub-processors, the main processor sends instructions to a series of sub-processors sequentially. Unfortunately, these methods have drawbacks associated with them.

One problem with distributing portions of a task among sub-processors is the possibility of a sequencing error, wherein some portions of the task are processed out of order, thereby generating incorrect data. Parallel sub-processing may be particularly susceptible to sequencing errors. Another problem is the need for the microprocessor, or main processor, to keep track of and control the operation of the sub-processors and shared resources (e.g., the data/address bus). Yet another problem is scalability. Certain computer architectures may be able to handle only a few sub-processors whereas other architectures may be able to handle any number of sub-processors. Furthermore, because sequential sub-processors receive tasks one at a time, sequential sub-processing takes more time than parallel sub-processing.

Various techniques have been developed and employed to alleviate such problems. For example, one computer architecture includes a main processor and multiple dedicated sub-processors that are hard-wired in a desired configuration. While such a computer architecture may reduce computation time, the hard-wired configuration is inflexible and may inefficiently employ scarce computing resources. Specifically, the hard-wired sub-processors may include a fixed data flow with on/off switching functions and programmable parameters. However, such functionality does not provide adequate flexibility to perform computationally intensive applications, such as the graphics shading example described above. Therefore, alternative architectures are desired to adequately address the aforementioned problems.

SUMMARY OF THE INVENTION

In accordance with one or more aspects of the invention, a multi-processing computer system comprises a main processor and a plurality of sub-processors. The main processor is operable to manage processing of instruction loops of a program. Each instruction loop includes one or more sub-instructions. The plurality of sub-processors are operable to process each sub-instruction in a plurality of sequential stages. At least a first one of the sub-processors is operable to sequentially receive the one or more sub-instructions from the main processor and to propagate the sub-instruction to a subsequent one of the sub-processors. At least a second one of the sub-processors is operable to sequentially receive the one or more sub-instructions from the first sub-processor.

Preferably, the main processor identifies a number of loop sets and a number of remainder loops to perform. If the number of loop sets is greater than zero, then the main processor sets a loop counter equal to the plurality of sub-processors that are available. The one or more sub-instructions are sequentially sent to the first one of the sub-processors along with the loop counter. The number of loop sets is decremented after all of the sub-instructions in a given loop are passed to the first one of the sub-processors. If the number of loop sets is equal to zero, then the main processor sets the loop counter equal to the number of remainder loops and sequentially sends the one or more sub-instructions to the first one of the sub-processors along with the loop counter.

In accordance with one or more further aspects of the invention, a multi-processing computer system comprises a main processor, a plurality of sub-processors and a cascading bus. The main processor is operable to manage processing of instruction loops of a program. Each instruction loop includes one or more sub-instructions. The plurality of sub-processors are operable to process each sub-instruction in a plurality of sequential stages. At least a first one of the sub-processors is operable to sequentially receive the one or more sub-instructions from the main processor and to propagate the sub-instruction to a subsequent one of the sub-processors. At least a second one of the sub-processors is operable to sequentially receive the one or more sub-instructions from the first sub-processor. The cascading bus is operable to provide the one or more sub-instructions from the main processor to the first one of the sub-processors.

In accordance with one or more further aspects of the present invention, a multi-processing method includes: managing processing of instructions loops of a program with a main processor, wherein each instruction loop includes one or more sub-instructions; sequentially receiving the one or more sub-instructions from the main processor in a first sub-processor, the first sub-processor being one of a plurality of sub-processors; processing each sub-instruction in a plurality of sequential stages; propagating the one or more sub-instructions to a subsequent one of the sub-processors if less than all of the instruction loops have been completed; and sequentially receiving the one or more sub-instructions in a second one of the sub-processors.

Preferably, the method includes determining a number of sub-processors available, identifying a number of loop sets to perform and identifying a number of remainder loops to perform. If the number of loop sets is greater than zero, the method preferably includes setting a loop counter equal to the plurality of sub-processors that are available, propagating the one or sub-instructions to the subsequent one of the sub-processors along with the loop counter and decrementing the number of loop sets after all of the sub-instructions in a given instruction loop are propagated to the first sub-processor. If the number of loop sets is equal to zero and the number of remainder loops is greater than zero, the method preferably includes setting the loop counter equal to the number of remainder loops and propagating the one or more sub-instructions to the subsequent one of the sub-processors along with the loop counter.

In accordance with one or more further aspects of the present invention, a multi-processing method includes: selecting an active main processor from among a first main processor in a first device and a second main processor in a second device; managing processing of instruction loops of a program with the active main processor, wherein each instruction loop includes one or more sub-instructions; sequentially receiving the one or more sub-instructions from the active main processor in a first sub-processor, the first sub-processor being one of a plurality of sub-processors; processing each sub-instruction in a plurality of sequential stages; propagating the one or more sub-instructions to a subsequent one of the sub-processors if a loop counter is greater than zero; and sequentially receiving the one or more sub-instructions in a second one of the sub-processors.

DETAILED DESCRIPTION

Figure 1:
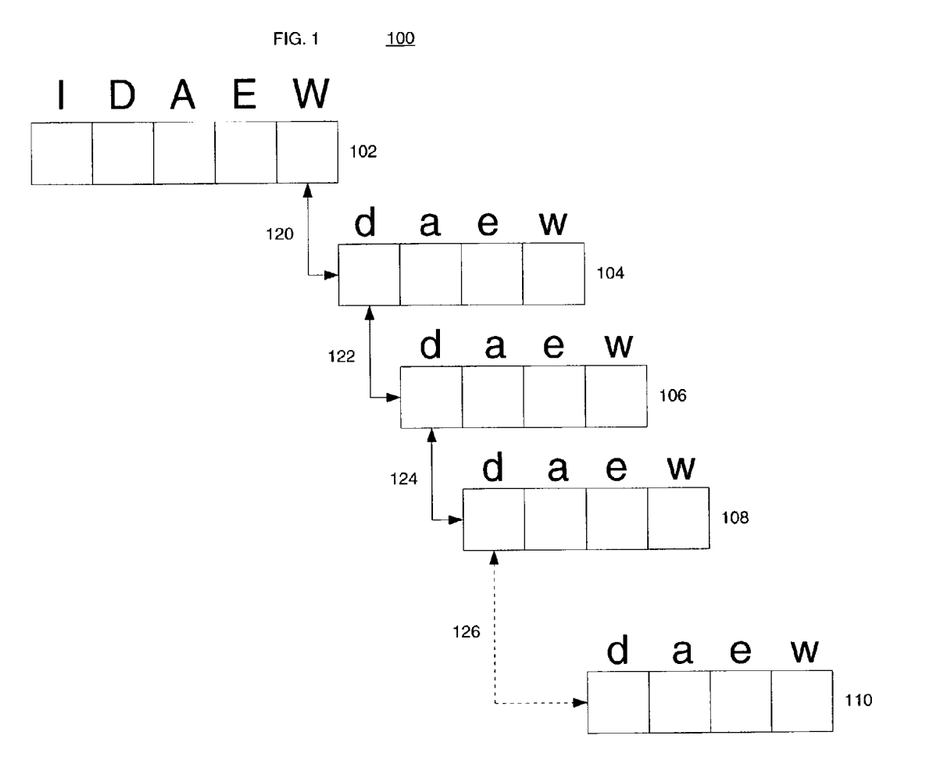
FIG. 1 is a high level diagram of computer system architecture for instruction processing employing one or more aspects of the present invention.

Referring now to the drawings, wherein like numerals indicate like elements, there is shown in FIG. 1 a multi-processing system architecture 100 employing one or more aspects of the present invention. The multi-processing system architecture 100 includes a main processor 102 and multiple sub-processors 104, 106, 108 and 110. While four sub-processors are illustrated in FIG. 1, the multi-processing system architecture 100 may employ any number of sub-processors. Preferably, at least two sub-processors are employed. There is no theoretical limitation on the number of sub-processors that may be employed.

The main processor 102 is preferably a general-purpose microprocessor capable of executing general computer instructions. The main processor 102 preferably accepts interrupts to stop or pause execution of a particular operation. In one preferred embodiment, the main processor 102 has a super-scalar architecture. In another preferred embodiment, the main processor 102 has a Very Long Instruction Word ("VLIW") architecture. The super-scalar and VLIW architectures are exemplary only, and should not be construed as limiting the architectures of the main processor 102 that are within the scope of the invention. Preferably, an Arithmetic and Logic Unit ("ALU") and a register file of the main processor 102 operate on vector data used in graphics processing, as is well-known in the art. The ALU performs basic data transformations such as arithmetic or logic operations (e.g., "AND", "OR", "NOT", etc.). The register file provides temporary storage when performing instructions.

By way of example only, the main processor 102 may perform computer instructions including loading/storing data, logical and arithmetic operations, and jumps, shifts and branch instructions. Preferably, the main processor 102 is operable to optionally perform an instruction fetch I, an instruction decode D, an address calculation A, an instruction execution E, and a write back operation W. During the instruction fetch I, an instruction is retrieved from memory for execution. An instruction fetch mechanism (e.g., a control unit of the main processor 102) preferably performs the instruction fetch I. The instruction fetch mechanism preferably includes an instruction cache memory. During the instruction decode D, it is determined what instruction has been fetched. The instruction decode D may, for example, employ an instruction look-up table. For instance, each instruction may be represented by a code. During the instruction decode D, the instruction look-up table may be employed to identify the instruction corresponding to the code. During the address calculation A, an address in memory is identified. The address in memory may contain data for use in the instruction execution E. The memory may be located in a device remote from the main processor 102 ("off-chip") or may be located on the same device as the main processor 102 ("on-chip"). The memory may be a local memory cache. During the instruction execution E, the ALU performs the instruction (e.g., "AND", "OR", "LOOP", "JUMP"). The write back operation W causes a result to be written into memory in either the same or a different location as where the data was stored, or otherwise returns a result.

The multi-processing system architecture 100 is designed to execute loop operations efficiently, thereby effectively performing computationally intensive calculations. For example, exemplary program instruction loops include the following process:

```
for (j=0; j<Num; j++)
{
Operation (j)
}
```

The main processor 102 manages processing of the instruction loops. The main processor 102 preferably performs operations outside of the loops (e.g., manages the counter to increment from j=0 to j<Num) and controls the loops by passing information to the sub-processors 104, 106, 108 and 110. The loops are preferably controlled according to the number of sub-processors 104, 106, 108 and 110 and the number of loops to be performed. The sub-processors 104, 106, 108 and 110 perform the operation (Operation (j)) within each loop. The operation may include one or more sub-operations.

As shown by the arrows 120, 122, 124 and 126, the main processor 102 and the sub-processors 104, 106, 108 and 110 are cascaded. The information flow shown by the arrows 120, 122, 124 and 126 is preferably implemented using a cascading bus. The cascading bus preferably comprises an instruction code bus that passes instructions and other information between the main processor 102 and the sub-processors 104, 106, 108 and 110. More preferably, the cascading bus is bi-directional. The information flow from the main processor 102 to the sub-processor 104 (e.g., the first sub-processor) includes one or more of instruction code, decoded information, data, parameters and the like, as well as a loop counter, which will be explained below with reference to FIGS. 3A–B. The sub-processor 104 may then pass some or all of this information to the sub-processor 106.

Each sub-processor 104, 106, 108 and 110 is operable to perform a pre-defined set of instructions (e.g., sub-instructions). This instruction set is preferably common to all sub-processors 104, 106, 108 and 110. In a preferred embodiment, the sub-instructions include all instructions used by the main processor 102 except instructions related to the program counter, such as "branch" and "jump." The sub-processors 104, 106, 108 and 110 preferably do not accept interrupts. Such a set of sub-instructions is preferably used to perform operations for a loop. The sub-processors 104, 106, 108 and 110 carry out one or more operations on each sub-instruction, including an instruction decode d, an address calculation a, an instruction execution e and a write back operation w. The operations d, a, e and w are in many ways equivalent to the operations D, A, E and W described above with reference to the main processor 102. Preferably, the write back operation w includes forwarding status information, results and the like from a sub-processor 104, 106, 108 or 110 to the main processor 102.

The main processor 102 preferably performs operations I, D, A, E, W and the sub-processors 104, 106, 108 and 110 preferably perform operations d, a, e and w in respective instruction processing pipelines. The instruction processing pipelines for each sub-processor 104, 106, 108 and 110 and the main processor 102 operate sequentially, as will be explained with reference to FIG. 2.

Figure 2:
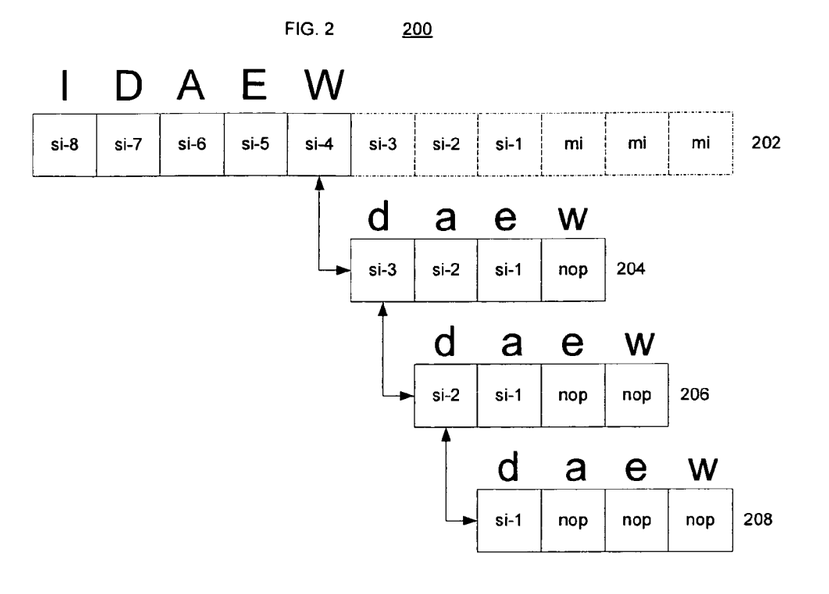
FIG. 2 is a more detailed architecture diagram of instruction processing in accordance with one or more aspects of the present invention.

FIG. 2 illustrates the multi-processing system architecture 100 of FIG. 1 in more detail. Among the capabilities of this architecture is the performance of multiple loops in parallel such that loop tasks are spread among multiple sub-processors 204, 206, 208 etc. while maintaining sequential operation. More particularly, FIG. 2 illustrates a snapshot 200 of a series of exemplary instruction loops at a specific instant in time (e.g., a cycle). A main processor 202 fetches or otherwise receives a series of instructions (preferably sequentially), including main processor instructions mi and sub-instructions si-1, si-2, . . . si-8. At the current cycle of operation for snapshot 200, the main processor 202 is performing an instruction fetch for sub-instruction si-8, an instruction decode D for sub-instruction si-7, an address calculation A for sub-instruction si-6, an instruction execution E for sub-instruction si-5 and a write back W for sub-instruction si-4. The main processor 202 has already processed sub-instructions si-3, si-2 and si-1, and three main processor instructions mi, as shown by the dashed lines around those instructions.

At the current cycle of operation for snapshot 200, the sub-processor 204 performs the instruction decode d on sub-instruction si-3, the address calculation a on sub-instruction si-2, the instruction execution e on sub-instruction si-1 and the write back operation w does not perform any operation ("nop"). The sub-processor 206 performs the instruction decode d on sub-instruction si-2, the address calculation a on sub-instruction si-1, no operation nop for the instruction execution e and no operation nop for the write back operation w. The sub-processor 208 performs the instruction decode d on sub-instruction si-1, no operation nop for the address calculation a, no operation nop for the instruction execution e and no operation nop for the write back operation w.

Each sub-processor 204, 206 and 208 performs the instruction processing for a single stage of the loop for each sub-instruction passed to that sub-processor 204, 206 and 208. Specifically, the sub-processor 204 performs d, a, e and w (if necessary) for a first iteration of the loop for sub-instruction si-1 (e.g., j=1), the sub-processor 206 performs d, a, e and w (if necessary) for a second iteration of the loop for sub-instruction si-1 (e.g., j=2), and the sub-processor 208 performs d, a, e and w for sub-instruction si-1 (if necessary) for a third iteration of the loop (e.g., j=3).

When the main processor 202 detects a sub-instruction for the sub-processors 204, 206 and 208, the main processor 202 outputs the sub-instruction to the sub-processor 204. The instructions for the main processor 202 are preferably distinguishable from the sub-instructions for the sub-processors 204, 206 and 208. One method of distinguishing the instructions of the main processor 202 from the sub-instructions of the sub-processors 204, 206 and 208 is to define discriminating instructions showing the starting and ending points for the sub-instructions. Another method is to define only one instruction set for the main processor 202 and the sub-processors 204, 206 and 208. Instructions in the instruction set are preferably distinguished by instruction operation codes ("op-codes"). The first word of an instruction is typically the op-code for that instruction. Preferably, the main processor 202 is assigned one set of op-codes and the sub-processors 204, 206 and 208 are assigned another set of op-codes. Alternatively, one or more bits in an instruction code bit field are preferably used to distinguish main processor instructions from sub-processor instructions. Yet another method is to define macro instructions for the sub-instructions as part of the instruction flow for the main processor 202. The sub-instructions are called when a macro instruction is executed. These methods are exemplary only; discrimination may be performed in other ways.

Depending upon how many loops will be performed, the sub-processors 204, 206, and 208 propagate or cascade the sub-instruction(s) to the next sub-processor 206, 208, etc. For example, in the snapshot 200, the main processor 202 performs the write back operation W on the sub-instruction si-4 and passes the sub-instruction si-3 to the sub-processor 204. The sub-processor 204 performs the instruction decode d on the sub-instruction si-3, the address calculation a on the sub-instruction si-2 and the instruction execution e on the sub-instruction si-1 and passes the sub-instruction si-2 to the sub-processor 206. The sub-processor 206 performs the instruction decode d on the sub-instruction si-2, the address calculation a on the sub-instruction si-1 and passes the sub-instruction si-1 to the sub-processor 208, which performs the instruction decode d thereon. A given sub-instruction will be propagated to the Nth sub-processor after N cycles.

Figure 3A:
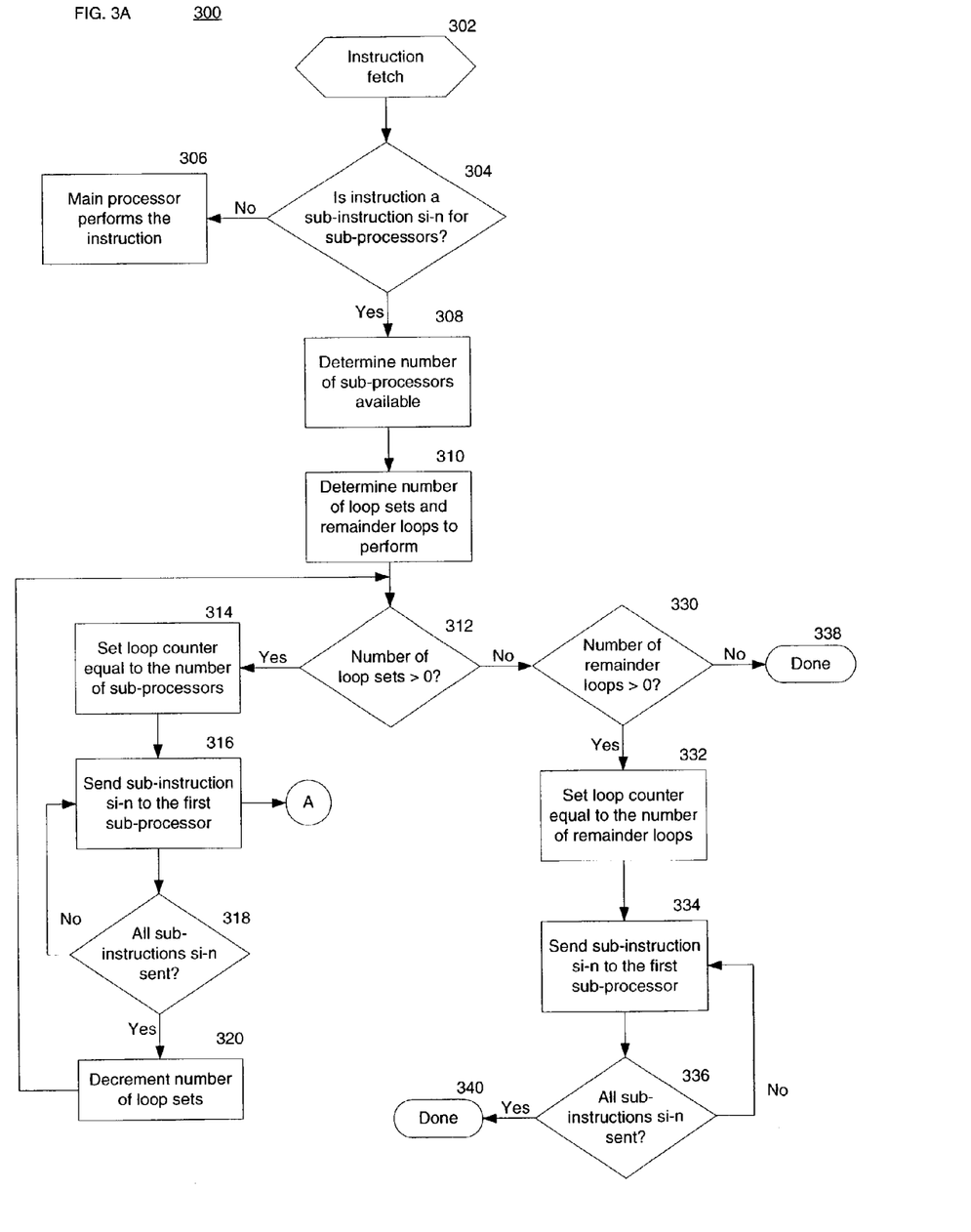
FIG. 3A is a flow chart illustrating instruction processing by a main processor in accordance with one or more aspects of the present invention.

With reference to FIG. 3A, a description of certain aspects of the invention concerning instruction processing 300 by the main processor 202 will now be made. At action 302, the main processor 202 fetches or otherwise obtains an instruction. At action 304, an inquiry is made as to whether the instruction is an instruction for the main processor 202 or a sub-instruction for the sub-processors 204, 206 and 208. If it is determined that the instruction is for the main processor 202, the process preferably branches to action 306 so that the main processor 202 can process the instruction. Otherwise, if it is determined that the instruction is a sub-instruction, the process preferably branches to action 308. At action 308, the number of available sub-processors 204, 206, and 208 is determined. Preferably, the number of available sub-processors 204, 206 and 208 remains constant for an entire set of loops.

At action 310, the number of loop sets and the number of remainder loops are preferably determined. The number of loop sets is the number of times the main processor 202 passes each sub-instruction to the sub-processor 204. The number of remainder loops is the number of loops that will be performed by less than all of the sub-processors 204, 206 and 208. By way of example only, if there are 1000 loops to be performed and 64 sub-processors, there are 15 loop sets and 40 remainder loops.

At action 312, an inquiry is made as to whether the number of loops sets is greater than zero (i.e., there is at least one loop set to be performed). If the number of loop sets is greater than zero, then the process flow preferably branches to action 314. If the number of loop sets is zero, then the process flow preferably branches to action 330. At action 314, a loop counter is set to a value equal to the number of sub-processors. As will be described in more detail with reference to FIG. 3B, the loop counter is used by a sub-processor 204, 206 or 208 to determine whether to pass a sub-instruction to a subsequent sub-processor. At action 316, a current sub-instruction si-n is sent to the sub-processor 204, as identified by element A. Further processing of the current sub-instruction si-n by the sub-processors 204, 206 and 208 will be described later with regard to FIG. 3B.

At action 318, an inquiry is made as to whether all sub-instructions si-n for a particular loop have been sent to the sub-processor 204. If all sub-instructions si-n have not been sent, then the process flow preferably returns to action 316 so that the next sub-instruction si-n may be sent. Otherwise, if all of the sub-instructions si-n have been sent, then the process flow preferably branches to action 320. At action 320, the number of loop sets is decremented to reflect that a loop set has been completed. In the example above, if the number of loop sets was initially set to 15, then the number of loop sets would be decremented to 14 upon completion of the first loop set (e.g., the first 64 loops). Preferably, the process flow then returns to action 312, where the number of loop sets is again checked.

When the number of loop sets is zero (i.e., all loop sets have been performed), the process flow preferably advances to action 330. At action 330, an inquiry is made as to whether the number of remainder loops is greater than zero. When the number of remainder loops is zero (i.e., no more sub-instructions need to be passed to the sub-processors 204, 206 and 208 because all loops have been performed), the process flow preferably branches to action 338, where the process flow terminates. When the number of remainder loops is greater than zero, the process flow preferably branches to action 332, where the loop counter is set equal to the number of remainder loops. In the example above, the loop counter would be set to 40, because 960 loops have already been performed by the fifteen loop sets. At action 334, the sub-instruction si-n is sent to the sub-processor 204. At action 336, an inquiry is made as to whether all sub-instructions si-n have been sent to the sub-processor 204. If all of the sub-instructions si-n have not been sent, then the process flow preferably returns to action 334. Otherwise, if all of the sub-instructions have been sent, then the process flow preferably branches to action 340, where the process flow terminates.

Figure 3B:
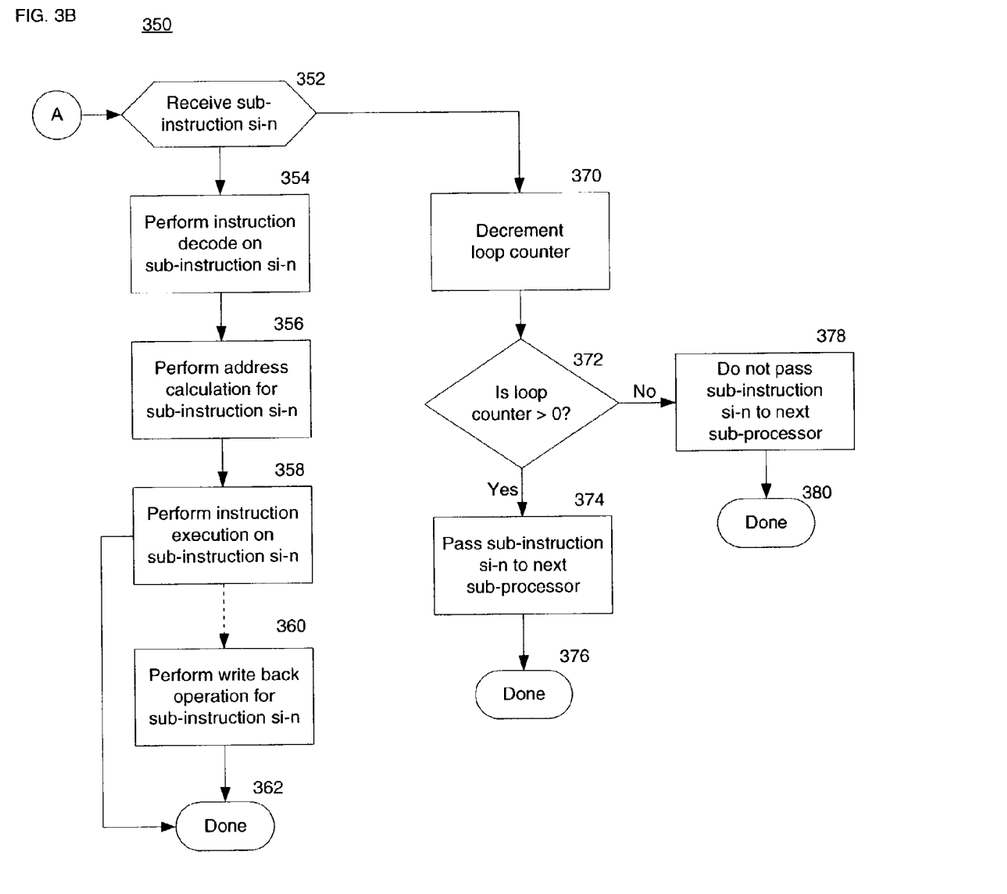
FIG. 3B is a flowchart illustrating instruction processing by a sub-processor in accordance with one or more aspects of the present invention.

With reference to FIG. 3B, a description of certain aspects of the invention concerning sub-instruction processing 350 by the sub-processors 204, 206 and 208 will now be made. At action 352, the sub-processor 204, 206 or 208 receives the sub-instruction si-n through element A. While passing the sub-instruction si-n from the main processor 202 was described in FIG. 3A with regard to the sub-processor 204, the actions in FIG. 3B apply to all of the sub-processors 204, 206 and 208.

Upon receipt of the sub-instruction si-n, two series of actions take place. One of the series is the instruction processing pipeline for a given sub-processor 204, 206 or 208. At action 354, the instruction decode d is performed on the sub-instruction si-n. At action 356, the address calculation a is performed on the sub-instruction si-n. At action 358, the instruction execution e is performed on the sub-instruction si-n. Optionally, the write back operation w is performed on the sub-instruction si-n at action 360. At action 362, the instruction execution pipeline terminates.

The other series of actions begins with action 370, where the loop counter is decremented. At action 372, an inquiry is made as to whether the loop counter is greater than zero. If the loop counter is greater than zero (i.e., additional loops will be performed), then the process flow preferably branches to action 374. Otherwise, the process flow preferably branches to action 378. At action 374, the current sub-processor 204, 206 or 208 passes the sub-instruction si-n to a subsequent sub-processor 206 or 208. At action 376, the process flow by the current sub-processor 204, 206 or 208 terminates. At action 378, when the loop counter is zero, the sub-instruction si-n is not passed to the subsequent sub-processor 206 or 208. Then the process flow terminates at action 380. Thus, in the above example, fifteen loop sets are performed by the 64 sub-processors 204, 206 and 208 to achieve 960 loops, and the first 40 sub-processors 204, 206 and 208 perform 40 remainder loops, thereby achieving a total of 1000 loops.

Returning to FIG. 2, each instruction processing pipeline permits the respective sub-processors 204, 206 and 208 to perform one operation (e.g., d, a, e or w) for multiple sub-instructions in a given cycle (e.g., one clock cycle). The instruction processing pipelines, coupled within the multi-processing system architecture 100, perform multiple loops for multiple sub-instructions in parallel. The multi-processing system architecture 100 spreads tasks (e.g., loops) among sub-processors while ensuring sequential operation of particular task portions (e.g., sub-instructions). Preferably, each sub-processor 204, 206 and 208 executes sub-instructions locally (e.g., in its own hardware). The sub-processors 204, 206 and 208 preferably access memory directly, without control or management by the main processor 202. The memory may be a cache memory, and, preferably, each of the sub-processors 204, 206 and 208 have their own cache memory.

Each sub-processor 204, 206, 208, etc. preferably has a processor number associated with it. The processor number is preferably identified in relation to the loop counter. A sub-processor program may employ the processor number, for example, to calculate parameters or to identify which of the sub-processors 204, 206, or 208 will perform the last loop in a series of instruction loops. As described above in relation to FIGS. 3A–B, when the loop counter is set equal to the number of sub-processors 204, 206 and 208, each of the sub-processors 204, 206 and 208 will perform an instruction loop. When the loop counter is set equal to the number of remainder loops, less than all of the sub-processors 204, 206 and 208 will perform an instruction loop. As in the example above, if there are 40 remainder loops and 64 sub-processors 204, 206 and 208, only the first 40 sub-processors 204, 206 and 208 (i.e., processor numbers 1 to 40) will perform instructions loops. As described in conjunction with action 378, the fortieth sub-processor 204, 206 or 208 will not pass the sub-instruction si-n to the forty-first sub-processor 204, 206 or 208.

The sub-processors 204, 206 and 208 may be located on-chip or off-chip relative to the main processor 202. If one or more of the sub-processors 204, 206 and 208 are located off-chip in a separate device, the separate device is preferably cascaded to the main processor 202.

Figure 4:
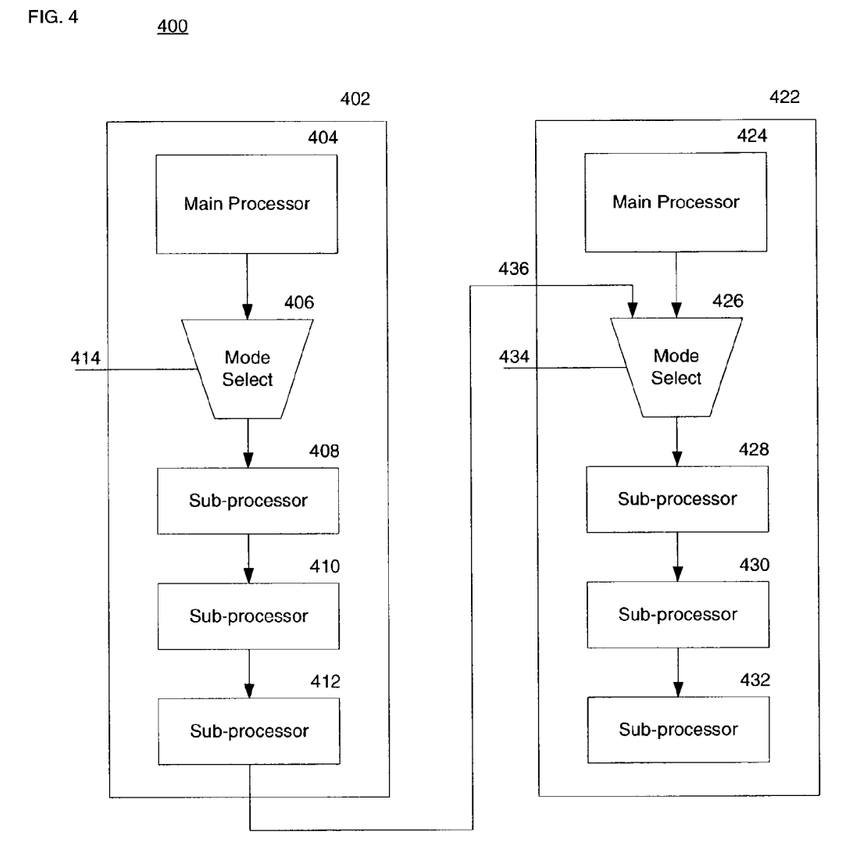
FIG. 4 is a high level diagram of computer system architecture for device cascading employing one or more further aspects of the present invention.

FIG. 4 illustrates an exemplary architecture 400 having a main device 402 and a sub-device 422. The main device 402 includes a main processor 404, a mode select 406, and any number of sub-processors 408, 410 and 412, where sub-processor 412 is an Nth sub-processor. The sub-device 422 includes a main processor 424, a mode select 426, and any number of sub-processors 428, 430 and 432. The main processor 404 is enabled to manage instruction loops of a program and, preferably, the main processor 404 performs operations outside of the instruction loops and controls the loops. As with the previous examples in this description, each instruction loop may involve the processing of one or more sub-instructions. The main processor 404 is preferably enabled by the mode select 406, which preferably includes a strap input 414. The main processor 424 is preferably disabled (by way of the mode select 426 and a strap input 434) to prevent it from interfering with managing the processing of the instruction loops by the main processor 404. The main processor 404, through the cascading process described above, manages the sub-processors 408, 410, 412, 428, 430 and 432. It is noted that the main processor 424 may also operate as a sub-processor, preferably receiving signals via a connection 436. Preferably, the main processor 404 always manages the processing of the instruction loops.

The main processor 404 can preferably identify how many sub-processors 408, 410, 412, 428, 430 and 432 (and optionally the main processor 424) are cascaded. This may be done in various ways. For example, hardware inputs or configuration inputs may identify how many sub-processors 408, 410, 412, 428, 430 and 432 are cascaded. Alternatively, the main processor 404 may employ data, count clock cycles or have other means to determine the number of sub-processors 408, 410, 412, 428, 430 and 432.

Advantageously, the methods and apparatus of the present invention permit reduction in the time for processing of instruction loops by cascading sub-instructions among multiple sub-processors. The main processor effectively manages the processing of instruction loops such that the sub-instructions are cascaded from one sub-processor to a next sub-processor. In this way, performing operations on each sub-instruction in an instruction processing pipeline ensures sequential operation of each loop iteration. The cascading bus provides efficient use of shared resources. Furthermore, the multi-processing computer system can handle any number of sub-processors, thereby providing a scalable architecture.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multi-processing computer system, comprising:
a main processor operable to manage processing of instruction loops of a program, each instruction loop including one or more sub-instructions; and
a plurality of sub-processors operable to process each sub-instruction in a plurality of sequential stages, at least a first one of the sub-processors being operable to sequentially receive the one or more sub-instructions from the main processor and to propagate the sub-instruction to a subsequent one of the sub-processors, and at least a second one of the sub-processors being operable to sequentially receive the one or more sub-instructions from the first sub-processor;
wherein the main processor and the plurality of sub-processors are cascaded together.

2. The multi-processing computer system according to claim 1, wherein each sub-processor operates on a given one of the sub-instructions with a respective instruction processing pipeline.

3. The multi-processing computer system according to claim 2, wherein the instruction processing pipeline for each sub-processor operates sequentially during one or more cycles.

4. The multi-processing computer system according to claim 3, wherein an instruction decoding is performed during a first cycle, an address calculation is performed during a second cycle and an instruction execution is performed during a third cycle.

5. The multi-processing computer system according to claim 4, wherein a write back operation is performed during a fourth cycle.

6. The multi-processing computer system according to claim 1, wherein the plurality of sub-processors do not accept interrupts.

7. The multi-processing computer system according to claim 1, wherein the plurality of sub-processors are operably connected to electronic memory.

8. The multi-processing computer system according to claim 7, wherein the plurality of sub-processors access the electronic memory directly.

9. The multi-processing computer system according to claim 1, wherein the main processor is operably connected to electronic memory.

10. The multi-processing computer system according to claim 9, wherein the electronic memory is a cache memory.

11. The multi-processing computer system according to claim 1, wherein the main processor forms part of a first device and at least some of the plurality of sub-processors form part of a second device, the second device being remote from and cascaded with the first device.

12. The multi-processing computer system according to claim 1, wherein the main processor is operable to detect an event for the one or more sub-processors, and upon detecting the event, the main processor sequentially outputs the one or more sub-instructions to the first one of the sub-processors.

13. The multi-processing computer system according to claim 12, wherein the main processor detects the event prior to initiating one or more of the instruction loops, and the main processor controls operation of the plurality of sub-processors.

14. The multi-processing computer system according to claim 1, wherein the main processor is capable of executing general computer instructions.

15. The multi-processing computer system according to claim 1, wherein the main processor is capable of accepting interrupts.

16. The multi-processing computer system according to claim 1, wherein the main processor employs a parallel architecture.

17. The multi-processing computer system according to claim 16, wherein the parallel architecture is a super-scalar architecture.

18. The multi-processing computer system according to claim 16, wherein the parallel architecture is a very long instruction word architecture (VLIW).

19. The multi-processing computer system according to claim 1, wherein the main processor includes an ALU and a register file, and the ALU and the register file are operable to treat vector data.

20. The multi-processing computer system according to claim 1, wherein the main processor identifies how many sub-processors are available.

21. The multi-processing computer system according to claim 20, wherein the main processor identifies a number of loop sets and a number of remainder loops to perform.

22. The multi-processing computer system according to claim 21, wherein, if the number of loop sets is greater than zero, then the main processor sets a loop counter equal to the plurality of sub-processors that are available, sequentially sends the one or more sub-instructions to the first one of the sub-processors along with the loop counter, and decrements the number of loop sets after all of the sub-instructions in a given instruction loop are passed to the first one of the sub-processors.

23. The multi-processing computer system according to claim 21, wherein, if the number of loop sets is equal to zero and the number of remainder loops is greater than zero, then the main processor sets a loop counter equal to the number of remainder loops and sequentially sends the one or more sub-instructions to the first one of the sub-processors along with the loop counter.

24. The multi-processing computer system according to claim 1, wherein a given sub-processor from among the plurality of sub-processors decrements a loop counter upon receiving a new sub-instruction, and if the loop counter is greater than zero, the given sub-processor passes the new sub-instruction to a next one of the plurality of sub-processors along with the loop counter, and if the loop counter is zero, the given sub-processor does not pass the new sub-instruction to the next one of the sub-processors.

25. A multi-processing computer system, comprising:
a main processor operable to manage processing of instruction loops of a program, each instruction loop including one or more sub-instructions;
a plurality of sub-processors operable to process each sub-instruction in a plurality of sequential stages, the main processor and the plurality of sub-processors being cascaded together, at least a first one of the sub-processors being operable to sequentially receive the one or more sub-instructions from the main processor and to propagate the sub-instruction to a subsequent one of the sub-processors, and at least a second one of the sub-processors being operable to sequentially receive the one or more sub-instructions from the first sub-processor; and
a cascading bus operable to provide the one or more sub-instructions from the main processor to the first one of the sub-processors.

26. The multi-processing computer system according to claim 25, wherein the cascading bus is bi-directional.

27. The multi-processing computer system according to claim 26, wherein the cascading bus provides loop data from the main processor to the first one of the sub-processors, the loop data including one or more of instruction code, decoded information, shading data, parameters and a loop counter.

28. The multi-processing computer system according to claim 26, wherein the cascading bus provides one or more of status information and result information from one or more of the plurality of sub-processors to the main processor.

29. The multi-processing computer system according to claim 25, further including an additional processor device cascaded to the main processor.

30. The multi-processing computer system according to claim 29, wherein the additional processor device includes an additional main processor.

31. The multi-processing computer system according to claim 30, wherein the additional main processor operates as one of the plurality of sub-processors.

32. The multi-processing computer system according to claim 31, wherein the additional main processor is selected to operate as one of the plurality of sub-processors by a mode select mechanism.

33. A multi-processing method, comprising:
managing processing of instruction loops of a program with a main processor, each instruction loop including one or more sub-instructions;
sequentially receiving the one or more sub-instructions from the main processor in a first sub-processor, the first sub-processor being one of a plurality of sub-processors, the main processor and the plurality of sub-processors being cascaded together;
processing each sub-instruction in a plurality of sequential stages;
propagating the one or more sub-instructions to a subsequent one of the sub-processors if not all of the instruction loops have been completed; and
sequentially receiving the one or more sub-instructions in a second one of the sub-processors,
so that execution of the instruction loops is obtained using the plurality of sub-processors.

34. The multi-processing method according to claim 33, wherein processing in the plurality of sequential stages includes the first sub-processor operating on given ones of the sub-instructions with an instruction processing pipeline.

35. The multi-processing method according to claim 34, further including sequentially operating the instruction processing pipeline during one or more cycles.

36. The multi-processing method according to claim 35, further including:
performing instruction decoding on a first sub-instruction in a first cycle;
performing address calculation on the first sub-instruction in a second cycle; and
performing instruction execution on the first sub-instruction in a third cycle.

37. The multi-processing method according to claim 36, further including performing a write back operation on the first sub-instruction in a fourth cycle.

38. The multi-processing method according to claim 35, further including, when a given instruction loop includes a first sub-instruction and a second sub-instruction:
performing instruction decoding on the first sub-instruction in a first cycle;
performing address calculation on the first sub-instruction in a second cycle;
performing instruction decoding on the second sub-instruction in the second cycle;
performing instruction execution on the first sub-instruction in a third cycle;
performing address calculation on the second sub-instruction in the third cycle; and
performing instruction execution on the second sub-instruction in a fourth cycle.

39. The multi-processing method according to claim 38, further including:
performing a write back operation on the first sub-instruction in the fourth cycle; and
performing the write back operation on the second sub-instruction in a fifth cycle.

40. The multi-processing method according to claim 33, further including:
prior to sequentially receiving the one or more sub-instructions, detecting an event at the main processor; and
sequentially outputting the one or more sub-instructions to the first sub-processor.

41. The multi-processing method according to claim 33, wherein, when the main processor includes an instruction fetch mechanism, retrieving the instruction loops from an instruction memory cache using the instruction fetch mechanism.

42. The multi-processing method according to claim 33, further including:
determining a number of sub-processors available;
identifying a number of loop sets to perform; and
identifying a number of remainder loops to perform.

43. The multi-processing method according to claim 42, further including, if the number of loop sets is greater than zero:
setting a loop counter equal to the plurality of sub-processors that are available;
propagating the one or more sub-instructions to the subsequent one of the sub-processors along with the loop counter; and
decrementing the number of loop sets after all of the sub-instructions in a given instruction loop are propagated to the first sub-processor.

44. The multi-processing method according to claim 42, further including, if the number of loop sets is equal to zero and the number of remainder loops is greater than zero:
setting a loop counter equal to the number of remainder loops; and
propagating the one or more sub-instructions to the subsequent one of the sub-processors along with the loop counter.

45. A multi-processing method, comprising:
selecting an active main processor from among a first main processor and a second main processor, the first main processor being located in a first device and the second main processor being located in a second device;
managing processing of instruction loops of a program with the active main processor, each instruction loop including one or more sub-instructions;
sequentially receiving the one or more sub-instructions from the active main processor in a first sub-processor, the first sub-processor being one of a plurality of sub-processors, the active main processor and the plurality of sub-processors being cascaded together;
processing each sub-instruction in a plurality of sequential stages;
propagating the one or more sub-instructions to a subsequent one of the sub-processors if a loop counter is greater than zero; and
sequentially receiving the one or more sub-instructions in a second one of the sub-processors,
so that execution of the instruction loops is obtained using the plurality of sub-processors.

46. The multi-processing method according to claim 45, wherein selecting the active main processor is performed using a mode select mechanism.

47. The multi-processing method according to claim 45, wherein the first main processor is selected as the active main processor and the second main processor operates as one of the plurality of sub-processors.

48. The multi-processing computer system according to claim 1, wherein instructions for execution by the main processor are distinguishable from the sub-instructions for the sub-processors.

49. The multi-processing computer system according to claim 48, wherein discriminating instructions identify the starting and ending points for the sub-instructions.

50. The multi-processing computer system according to claim 48, wherein the instruction for execution by the main processor and the sub-instructions for the sub-processors are distinguished by instruction operation codes.

51. The multi-processing method according to claim 33, further comprising distinguishing instructions for execution by the main processor from the sub-instructions for the sub-processors.

52. The multi-processing computer system according to claim 51, wherein the sub-instructions for the sub-processors are distinguished from the main processor instructions by defining macro instructions for the sub-instructions and calling one or more of the sub-instructions when a given macro instruction is executed.

* * * * *